United States Patent [19]

Iijima

[11] 4,105,100
[45] Aug. 8, 1978

[54] HYDRAULIC CONTROL SYSTEM FOR A POWER TRANSMISSION

[75] Inventor: Tetsuya Iijima, Tokyo, Japan

[73] Assignee: Nissan Motor Company, Ltd., Japan

[21] Appl. No.: 734,591

[22] Filed: Oct. 21, 1976

[30] Foreign Application Priority Data

Oct. 22, 1975 [JP] Japan .............................. 50-126444

[51] Int. Cl.² ...................... F16D 23/00; F16D 43/22
[52] U.S. Cl. .................................................. 192/.034
[58] Field of Search ....................................... 192/.034

[56] References Cited

U.S. PATENT DOCUMENTS

3,817,357  6/1974  Mori et al. ........................... 192/.034

FOREIGN PATENT DOCUMENTS

758,835  10/1956  United Kingdom .................... 192/.034

*Primary Examiner*—Leonard H. Gerin
*Attorney, Agent, or Firm*—Robert E. Burns; Emmanuel J. Lobato; Bruce L. Adams

[57] ABSTRACT

Delay means is provided for, when a parameter representative of a function of the output torque of an engine is abruptly varied and fails to represent the function, delaying the transmission of variation in the parameter to regulator means, for regulating a control pressure for a hydraulically operated clutch in accordance with the parameter, to cause the regulator means to regulate the control pressure to vary at a rate lower than that of variation of the parameter.

5 Claims, 2 Drawing Figures

HYDRAULIC CONTROL SYSTEM FOR A POWER TRANSMISSION

BACKGROUND OF THE INVENTION

The present invention relates generally to a hydraulic control system for a hydraulically operated clutch of a power transmission of a motor vehicle and particularly to a hydraulic control system of this type which is improved to comprise means for, when a parameter representative of a function of the output torque of an engine of the vehicle in accordance with which parameter regulator means regulates a control pressure for the clutch abruptly varies and fails to represent the function during deceleration, delaying the transmission of variation in the parameter to the regulator means to prevent the control pressure from being regulated to vary at the same rate as that of variation in the parameter so that the clutch capacity is prevented from being temporarily insufficient with respect to the engine output torque to prevent the generation of an abnormal noise and a shock.

As is well known in the art, a hydraulic control system for a power transmission of a motor vehicle is provided with regulator means for regulating a control or working pressure for a hydraulically operated clutch in accordance with a parameter such as an intake passageway vacuum representative of a function of the output torque of an engine of the vehicle. This is to control the capacity of the clutch to a necessary minimum value in accordance with the output torque of the engine and to reduce a shock generated in the transmission during shifting of a gear ratio. In this instance, as the margin of the clutch capacity is reduced, a shock produced during change of a gear ratio is reduced.

However, a power transmission having a conventional hydraulic control system has been encountered by an inconvenience that an abnormal noise and/or a shock is produced when the accelerator pedal is returned toward its zero output position to decelerate the vehicle just after its sudden start or during its ascending travel for allowing a following vehicle to outstrip the preceding vehicle or for avoiding a collision with a retrograding vehicle. Such a noise and shock occur because, since although the parameter such as the intake passageway vacuum quickly complies with or responds to abrupt movement of the accelerator pedal toward its zero output position, the output torque or load of the engine slowly responds to the abrupt movement of the accelerator pedal, the capacity of the clutch is instantaneously or temporarily insufficient with respect to the engine output torque to create a slippage in the clutch.

As a measure for preventing the slippage being produced in the clutch, there is a notion of increasing the margin of the clutch capacity, for example, by increasing a preset value of the working pressure or the number of the clutch plates. However, these measures result in the occurrence of a shock during change of a gear ratio and an increase in the production cost.

SUMMARY OF THE INVENTION

It is, therefore, an object of the invention to provide a hydraulic control system for a hydraulically operated clutch of a motor vehicle transmission which is improved to comprise means for, when the output torque of the engine fails to comply with or respond to abrupt variation in a parameter such as an intake passageway vacuum representative of a function of the engine output torque as during deceleration, delaying the transmission of variation in the parameter to regulator means for regulating a control pressure for the clutch in accordance with the parameter to prevent the control pressure from being regulated to vary at a rate similar to that of variation in the parameter so that the clutch capacity is prevented from being temporarily insufficient with respect to the engine output torque to prevent an abnormal noise and a shock from occurring.

BRIEF DESCRIPTION OF THE DRAWINGS

This and other objects and advantages of the invention will become more apparent from the following detailed description taken in conjunction with the accompanying drawings in which.

DESCRIPTION OF THE PREFERRED EMBODIMENTS

Figure 1:
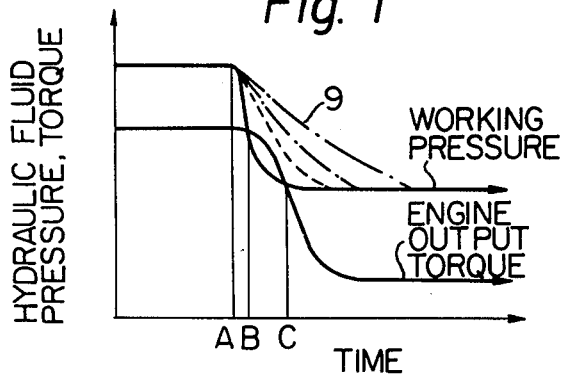
FIG. 1 is a graphic representation of the relationship between both the engine output torque and the working or control pressure for a hydraulically operable clutch with respect to time.

Referring to FIG. 1 of the drawings, there is shown the relationship between both the clutch working or control pressure and the engine output torque with respect to time upon deceleration as at the times as per the introduction of the present specification. In FIG. 1, a point A designates the point of beginning of the deceleration. A conventional hydraulic control system has produced a working pressure as shown by the solid line in FIG. 1 which varies in accordance with variation in a parameter such as an intake passageway vacuum representative of a function of the output torque of the engine simultaneously with the beginning of the deceleration. The working pressure is less than the engine output torque within a range of time of points B and C so that the clutch begins to slip at the point B and engages producing a shock at the point C. A hydraulic control system according to the invention produces a working pressure as shown by broken lines 9 in FIG. 1 which varies later than variation in the parameter simultaneously with the beginning of the deceleration by a provision of means as described hereinafter.

Figure 2:
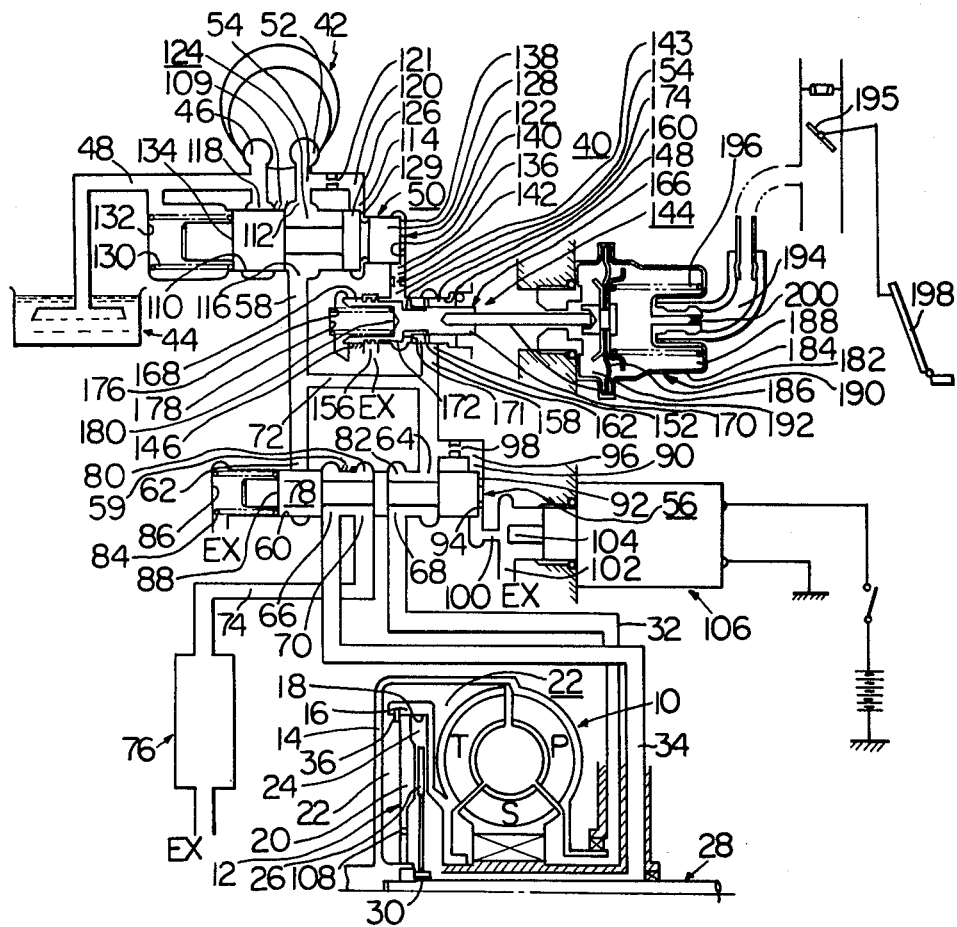
FIG. 2 is a schematic cross sectional view of a a preferred embodiment of a hydraulic control system according to the invention.

Referring to FIG. 2 of the drawings, there is shown a hydraulic torque converter 10 and a hydraulic power clutch 12 for an automatic power transmission (not shown) of a motor vehicle (not shown) and a hydraulic control system according to the invention which is combined with the torque converter 10 and the clutch 12. The torque converter 10 includes a pump impeller P driven from an engine (not shown) of the vehicle, a turbine T hydrokinetically driven by the pump impeller P, and a stator or reaction element S. The clutch 12 is enclosed in a housing 14 of the torque converter 10 and includes a clutch cover 16 integral with the turbine T and formed therein with a cylindrical bore 18, a piston 20 slidably fitted in the bore 18 and defining a first chamber 22 outside the clutch cover 16 and in the converter housing 14 and a second chamber 24 in the clutch cover 16, and a clutch disk 26 interposed between the clutch cover 16 and piston 20 and drivingly connected to an input shaft 28 of the transmission through a spline 30. Passage means 32 is provided which communicates through the interior of the torque converter 10 with the first chamber 22 for supplying pressurized hydraulic fluid thereinto so that the piston 20 is forced toward the clutch disk 26 to press it against the clutch cover 16 to engage the clutch 12. Passage means 34 is provided which communicates with the second chamber 24 for supplying pressurized hydraulic fluid thereinto so that the piston 20 is forced away from the clutch disk 26 and is inhibited to press it against the clutch cover 16 to release the clutch 12. A snap ring 36 is securely fixed to the clutch cover 16 to limit the movement of the piston 20 away from the clutch disk 26 during disengagement of the clutch 12.

The hydraulic control system, generally designated by the reference numeral 40, comprises a pump 42, and a hydraulic fluid tank 44 communicating with an inlet port 46 of the pump 42 through a passage 48, a pressure regulator valve 50 communicating with an outlet or discharge port 52 of the pump 42 through a passage 54, and a clutch control valve 56 communicating with the pressure regulator valve 50 through a passage 58. The pump 42 draws hydraulic fluid from the hydraulic fluid tank 44 and discharges pressurized hydraulic fluid into the passage 54 to produce therein and in the passage 58 a line or control pressure for controlling the torque conveter 10 and the clutch 12. The line pressure in the passages 54 and 58 is regulated to vary in accordance with the load of the engine by the pressure regulator valve 50 as described hereinafter.

The clutch control valve 56 comprises a valve body 59 defining therein a bore or valve chamber 60 having first and second inlet ports 62 and 64, first and second outlet ports 66 and 68, and a drain port 70 each of which opens into the bore 60. The inlet ports 62 and 64 communicate respectively with the passage 58 and a passage 72 branching off therefrom. The outlet ports 66 and 68 communicate respectively with the passages 34 and 32. The drain port 70 communicates with a drain line 74 and a cooler 76. A valve spool 78 is slidably fitted in the valve chamber 60 and is formed therein with first and second annular grooves 80 and 82. The valve spool 78 has and is movable between a first position in which the first annular groove 80 provides communication between the first inlet and outlet ports 62 and 66 and the second annular groove 82 provides communication between the second outlet port 68 and the drain port 70 and a second position shown in FIG. 2 in which the first annular groove 80 provides communication between the first outlet port 66 and the drain port 70 and the second annular groove 82 provides communication between the second inlet and outlet ports 64 and 68. A compression spring 84 is interposed between one end wall 86 of the bore 60 and one end 88 of the valve spool 78 and urges the valve spool 78 into the second position. The bore 60 further has a third inlet port 90 opening into the bore 60 between the other end 92 of the valve spool 78 and the other end wall 94 of the bore 60. The third inlet port 90 communicates with a passage 96 communicating with the passage 72 and formed therein with an orifice 98. The inlet port 90 also communicates with a drain port 100 communicating with a drain line 102. A control valve 104 is provided to open and close the drain port 100. A solenoid 106 is provided to cause the control valve 104 to close and open the drain port 100. When the drain port 100 is closed, the hydraulic fluid pressure acting on the end 92 of the valve spool 78 is increased to a value equal to or near the line pressure to move the valve spool 78 into the first position in opposition to the force of the spring 84. As a result, communication is provided between the passages 58 and 34 and between the passages 32 and 74 to cause supply of the control pressure into the second chamber 24 and discharge of hydraulic fluid from the first chamber 22 for release of the clutch 12. On the contrary, when the drain port 100 is opened, the line pressure fed into the third inlet port 90 is exhausted from the drain port 100 into the drain line 102 to allow the spring 84 to force the valve spool 78 against the end wall 94 of the bore 60. As a result, communication is provided between the passages 72 and 32 and between the passages 34 and 74 to cause supply of the line pressure into the first chamber 22 and discharge of hydraulic fluid from the second chamber 24 for engagement of the clutch 12. The piston 20 is formed therethrough with an orifice 108 which provides communication between the first and second chambers 22 and 24. Accordingly, a part of the line pressure fed into the chamber 22 flows into the chamber 24 through the orifice 108. At this time, a back pressure is generated in the chamber 24 due to a flow line resistance in the cooler 76. The back pressure is one of factors for deciding the value of the line pressure.

The pressure regulator valve 50 comprises a valve body 109 defining therein a bore or valve chamber 110 which has first and second inlet ports 112 and 114, an outlet port 116 and a drain port 118 each of which opens into the bore 110. The inlet ports 112 and 114 communicates respectively with the passage 54 and a passage 120 branching off therefrom and formed therein with an orifice 121. The outlet port 116 communicates with the passage 58. The drain port 118 communicates with the hydraulic fluid tank 44. A valve spool 122 is slidably fitted in the bore 110 and has an annular groove 124 formed therein, and large and small lands 126 and 128. The inlet port 114 communicates with a step 129 between the lands 126 and 128. When the valve spool 122 is moved in a first direction or leftwards in the drawing, the annular groove 124 provides communication between both the inlet and outlet ports 112 and 116 and the drain port 118 or increases the effective cross sectional area of a flow path of hydraulic fluid from the ports 112 and 116 to the port 118 to reduce the line pressure. On the contrary, when the valve spool 122 is moved in a second direction or rightwards in the drawing, the valve spool 122 obstructs communication between both the inlet and outlet ports 112 and 116 and the drain port 118 or the annular groove 124 reduces the effective cross sectional area of the flow path of hydraulic fluid from the ports 112 and 116 to the port 118 to increase the line pressure. A compression spring 130 is interposed between one end wall 132 of the bore 110 and one end 134 of the valve spool 122 and urges the valve spool 122 in the second direction. The bore 110 further has a third inlet port 136 opening into the bore 110 between the other end 138 of the valve spool 122 and the other end wall 140 of the bore 110 and communicating with a passage 142 which is formed therein with an orifice 143. A modulator pressure $P_M$ is produced in the passage 142 by a modulator valve 144 as described later. The valve spool 122 is urged in the first direction by the line pressure $P_L$ in the passage 114 acting on the difference $A_1$ between the areas of or the step 129 between the lands 126 and 128 and the modulator pressure $P_M$ in the passage 142 acting on the area $A_2$ of the end 138 of the land 128 in opposition to the force $K_1$ of the spring 130. Thus, the following equation is obtained:

$$P_L A_1 + P_M A_2 = K_1 \tag{1}$$

From the equation (1), the line pressure $P_L$ is expressed as $$P_L = (K_1 - P_M A_2/A_1) \qquad (2)$$

From the equation (2), it will be understood that as the modulator pressure $P_M$ is increased, the line pressure $P_L$ is reduced.

The modulator valve 144 produces the modulator pressure $P_M$ reduced and increased respectively in accordance with increases and decreases in the output torque or load of the engine and comprises a valve body 146 defining therein a bore or valve chamber 148 which has inlet and outlet ports 152 and 154, and a drain port 156 each of which opens into the bore 148. The ports 152 and 154 communicate respectively with a passage 158 and the passage 142. The drain port 156 communicates with a drain line (not shown). The passage 158 communicates with the passage 72. A sleeve 160 is fixedly fitted in a part of the bore 148 and is formed therethrough with an aperture 162 communicating with the inlet port 152. A valve spool 166 is slidably located in the bore 148 and comprises first and second portions 168 and 170 which are integral with each other and are fitted respectively in the bore 148 and the sleeve 160. The diameter of the first portion 168 is larger than that of the second portion 170. The outlet port 152 communicates with the differential area $A_3$ of or a step 171 between the first and second portions 168 and 170 so that the modulator pressure $P_M$ acts on the step 171 to urge the valve spool 166 in a first direction or leftwards in the drawing. The valve spool 166 has a first annular groove 172 formed in the first portion 168 and a second annular groove 174 formed in the second portion 170. A compression spring 176 is interposed between an end wall 178 of the bore 148 and one end 180 of the valve spool 166 and urges the valve spool 166 in a second direction or rightwards in the drawing. When the valve spool 166 is moved in the first direction, the first groove 172 provides communication between the outlet and drain ports 154 and 156 or increases the effective cross sectional area of a flow path of hydraulic fluid from the port 154 to the port 156. As a result, hydraulic fluid is drained from the port 154 into the port 156 or the hydraulic fluid drained thereinto is increased to reduce the modulator pressure $P_M$. When the valve spool 166 is moved in the second direction, the second groove 174 provides communication between the aperture 162 and the outlet port 152 or increases the effective cross sectional area of a flow path of the line pressure from the aperture 162 to the port 154. As a result, the line pressure is admitted into the passage 142 or the line pressure admitted thereinto is increased to increase the modulator pressure $P_M$.

A diaphragm unit 182 is provided to adjust the modulator pressure $P_M$ in accordance with the load of the engine and comprises a housing 184 having first and second chambers 186 and 188, a flexible diaphragm 190 separating the chambers 186 and 188 from each other, and a push rod 192 operatively connecting the diaphragm 190 to the second portion 170 of the valve spool 166. The first chamber 186 communicates with the atmosphere. Passage or conduit means 194 is provided for feeding into the second chamber 188 engine suction or intake passageway vacuum representative of the engine load and communicates the second chamber 188 with an intake passageway (not shown) downstream of a throttle valve 195 of the engine. A spring 196 is provided to urge the diaphragm 190 in the first direction. The second chamber 188 is located with respect to the diaphragm 190 in such a manner that when the engine suction is increased, the differential pressure of the chambers 186 and 188 moves the diaphragm 190 in the second direction in opposition to the force of the spring 196 to reduce the force of the push rod 192 which biases the valve spool 166 in the first direction and when the engine suction is reduced, the force of the spring 196 is allowed to move the diaphragm 190 in the first direction in opposition to the differential pressure of the chambers 186 and 188 to increase the biasing force of the push rod 192. As the degree of opening of the throttle valve 195, that is, the engine load, is increased, the engine suction approaches to the atmospheric pressure and accordingly the biasing force F of the push rod 192 approaches to the force of the spring 196. On the contrary, when the opening degree of the throttle valve 195 and accordingly the engine load is reduced, the engine suction is increased so that the biasing force F of the push rod 192 is reduced. Accordingly, the biasing force F of the push rod 192 is varied in accordance with the engine load.

Thus, the following equation is obtained:

$$P_M A_3 + F = K_2 \qquad (3)$$

where $K_2$ is the force of the spring 176. From the equation (3), the modulator pressure $P_M$ is expressed as $$P_M = (K_2 - F/A_2) \leq P_L \qquad (4)$$

and can be varied within a range of O and $P_L$. The maximum of the line pressure $P_L$ is obtained when the modulator pressure $P_M$ is equal to zero. At this time, from the equation (2) the line pressure $P_L$ is expressed as $$, P_L = (K_1/A_1) \qquad (5)$$

The minimum of the line pressure $P_L$ is obtained when the modulator pressure $P_M$ is equal to the line pressure $P_L$. At this time, from the equation (2) the line pressure $P_L$ is expressed as $$P_L = (K_1/A_1 + A_2) \qquad (6)$$

As is apparent from the equations (5) and (6), the maximum and minimum of the line pressure $P_L$ are determined by the size of the pressure regulator valve 50 and the force $K_1$ of the spring 130. The characteristics of the line pressure $P_L$ between the maximum and minimum is determined by the characteristics of the modulator pressure $P_M$ which is determined by the characteristics of the biasing force F of the push rod 192, the size of the modulator valve 144 and the force $K_2$ of the spring 176.

The modulator valve 144 is provided with delay means for delaying the transmission, to the second chamber 188 of the diaphragm unit 182, of rapid variation in the intake passageway vacuum due to rapid movement of an accelerator pedal 198 of the vehicle or rapid variation in the degree of depression of the accelerator pedal 198 to prevent variation in the line pressure from complying with variation in the engine suction and to cuase variation in the line pressure to comply with variation in the output torque of the engine. The delay means is formed from an orifice or a restricted passage 200 formed or located in the passage means 194. By the provision of the delay means, when the accelerator pedal 198 is abruptly returned from a high output generating position toward a no output generating position after the vehicle is started by a rapid depression of the accelerator pedal 198, although the intake passageway vacuum is suddenly increased, the vacuum in the vacuum chamber 188 acting on the diaphragm 190 of the diaphragm unit 182 is prevented from being suddenly increased and instead is gradually increased with a time lag by the provision of the delay means or the orifice 200 so that the line pressure is prevented from being rapidly reduced and is gradually reduced in accordance with decreases in the engine output torque, as shown by a broken oblique line 9 in FIG. 1. Accordingly, the clutch capacity is prevented from being temporarily insufficient with respect to the engine output torque to prevent the occurrence of a noise and shock. The rate of reduction in the line pressure with respect to time can be varied by selecting the cross sectional area or diameter of the orifice 200 as shown by various broken lines 9 in FIG. 1. It is necessary the diameter of the orifice 200 is selected in such a way as to obtain an optimum characteristics of the rate of reduction of the line pressure to time in dependence on a motor vehicle employing a hydraulic control system according to the invention.

Although the invention has been described to be applied to a hydraulic control system for a motor vehicle automatic power transmission having a hydraulic torque converter and a hydraulically operated clutch combined with the torque converter, the invention can be applied to hydraulic control systems for other ordinary automatic power transmissions, of motor vehicles, in which a forward clutch is engaged by a line or control pressure in first gear and the power of the engine is transmitted to a planetary gear train through a hydraulic torque converter and the forward clutch. In a hydraulic control system for such a transmission, the line pressure for controlling the capacity of the forward clutch is regulated by a pressure regulator valve controlled by a throttle pressure so that the line pressure and accordingly the clutch capacity is varied in accordance with the output torque of the engine. A vacuum throttle valve for producing the throttle pressure is controlled by a diaphragm unit operated by an intake passageway vacuum. Accordingly, an orifice provided in passage means for feeding the intake passageway vacuum into a vacuum chamber of the diaphragm unit is effective to prevent the occurrence of an abnormal noise and a shock during deceleration as just after the vehicle's start, simularly to the hydraulic control system shown in FIG. 2.

It will be appreciated that the invention provides a hydraulic control system for a hydraulically operated clutch of a power transmission which is improved to comprise means for, when a parameter such as an intake passageway vacuum representative of a function of the output torque of an engine of the vehicle is abruptly varied and fails to represent the function as during deceleration, delaying the transmission of variation in the parameter to regulator means for regulating a control pressure for the clutch in accordance with the parameter to prevent the control pressure from being regulated to vary at the same rate as that of variation in the parameter so that the capacity of the clutch is prevented from being temporarily insufficient with respect to the engine output torque.

What is claimed is:

1. A hydraulic control system for a power transmission of a motor vehicle, comprising means for producing a control pressure of hydraulic fluid for controlling a hydraulically operated clutch of the power transmission, regulator means for regulating said control pressure in accordance with a parameter representative of a function of the output torque of an engine of the vehicle, delay means for delaying the transmission of variation in the parameter to said regulator means, when the parameter abruptly varies and fails to represent the function, to prevent said control pressure from being varied at the same rate as that of abrupt variation in the parameter, said parameter being a vacuum prevailing in an intake passageway of the engine, said regulator means comprising a modulator valve for producing a modulator pressure varying in accordance with the intake passageway vacuum and movable in one direction to effect a decrease in said modulator pressure and in another direction to effect an increase in said modulator pressure, biasing means for moving said modulator valve in said one direction in response to a decrease in the intake passageway vacuum and in said another direction in response to an increase in the intake passageway vacuum, and a pressure regulator valve for regulating said control pressure in accordance with said modulator pressure and movable in one direction to effect a decrease in said control pressure in response to an increase in said modulator pressure and in another direction to effect an increase in said control pressure in response to a decrease in said modulator pressure, and said delay means comprising means for delaying the response of said biasing means to variation in the intake passageway vacuum when the intake passageway vacuum abruptly varies.

2. A hydraulic control system as claimed in claim 1, in which said biasing means comprises a flexible diaphragm operatively connected to said modulator valve and having on a side a fluid chamber filled with the intake passageway vacuum, and passage means for feeding the intake passageway vacuum into said fluid chamber, and said delaying means is an orifice formed in said passage means.

3. A hydraulic control system as claimed in claim 2, in which said modulator valve comprises means defining a port which communicates with said control pressure producing means and with a drain line and in which said modulator pressure is produced, a first valve spool having a step which communicates with said modulator pressure producing port and is acted on by said modulator pressure to urge said first valve spool in said one direction, and a spring urging said first valve spool in said another direction, and said pressure regulator valve comprises a second valve spool having a step which communicates with said control pressure producing means and is acted on by said control pressure to urge said second valve spool in said one direction, a land which communicates with said modulator pressure producing port and is acted on by said modulator pressure to urge said second valve spool in said one direction, and a groove which communicates with said control pressure producing means and with a drain line and in which said control pressure is regulated, and a spring urging said second valve spool in said another direction.

4. A hydraulic control system as claimed in claim 3 in combination with said clutch, in which said clutch has first and second chambers, and said hydraulic control system further comprises a clutch control valve comprising a valve body defining therein a third bore having first, second and third inlet ports each communicating with said groove of said pressure regulator valve, first and second outlet ports communicating respectively with said second and first chambers of said clutch, a first drain port, and a second drain port communicating with said third inlet port and alternatively closed and opened, a third valve spool slidably fitted in said third bore and formed therein with first and second annular groove and having and movable between a first position in which said first annular groove provides communication between said first inlet and outlet ports and said second annular groove provides communication between said second outlet port and said first drain port to feed said control pressure into said second chamber and to discharge hydraulic fluid from said first chamber for causing disengagement of said clutch and a second position in which said first annular groove provides communication between said first outlet and drain ports and said second annular groove provides communication between said second inlet and outlet ports to feed said control pressure into said first chamber and to discharge hydraulic fluid from said second chamber for causing engagement of said clutch, and a spring moving said third valve spool into said second position when said second drain port is opened, said third valve spool having a land on which said control pressure in said third inlet port acts to move said third valve spool into said first position in opposition to the force of said spring when said second drain port is closed, a control valve operable to close and open said second drain port, operating means for causing said control valve to close and open said second drain port.

5. A hydraulic control system as claimed in claim 1, in which said biasing means comprises a flexible diaphragm operatively connected to said modulator valve and having on a side thereof a fluid chamber, passage means for providing communication between said fluid chamber and the intake passageway, and a spring for moving said modulator valve and said diaphragm in said another direction in response to an increase in the intake passageway vacuum and for allowing the intake passageway vacuum to move said modulator valve and said diaphragm in said one direction in response to a decrease in the intake passageway vacuum, and said delay means comprising a restricted passage located in said passage means.

* * * * *